(12) United States Patent
Terry et al.

(10) Patent No.: US 9,674,834 B2
(45) Date of Patent: Jun. 6, 2017

(54) HYBRID APPARATUS USING PHYSICAL CHANNELS

(71) Applicant: InterDigital Technology Corporation, Wilmington, DE (US)

(72) Inventors: Stephen E. Terry, Northport, NY (US); Stephen G. Dick, Nesconset, NY (US); James M. Miller, Verona, NJ (US); Eldad M. Zeira, Huntington, NY (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 73 days.

(21) Appl. No.: 13/963,447

(22) Filed: Aug. 9, 2013

(65) Prior Publication Data

US 2013/0322411 A1 Dec. 5, 2013

Related U.S. Application Data

(63) Continuation of application No. 13/458,377, filed on Apr. 27, 2012, now Pat. No. 8,509,195, which is a
(Continued)

(51) Int. Cl.
*H04B 7/212* (2006.01)
*H04B 7/216* (2006.01)
(Continued)

(52) U.S. Cl.
CPC ...... *H04W 72/0446* (2013.01); *H04B 7/0686* (2013.01); *H04B 7/2618* (2013.01); *H04J 13/16* (2013.01); *H04W 72/042* (2013.01)

(58) Field of Classification Search
CPC ............... H04J 13/16; H04J 2013/0085; H04J 2013/165; H04B 7/0686; H04B 7/0868;
(Continued)

(56) References Cited

U.S. PATENT DOCUMENTS 5,260,967 A 11/1993 Schilling
5,319,634 A 6/1994 Bartholomew et al.
(Continued)

FOREIGN PATENT DOCUMENTS

EP 0 605 188 7/1994
EP 0 841 763 5/1998
(Continued)

OTHER PUBLICATIONS

3GPP, "3rd Generation Partnership Project; Technical Specification Group Radio Access Network; Radio Resource Control (RRC); Protocol Specification (Release 1999)," 3GPP TS 25.331 V3.6.0 (Mar. 2001).
(Continued)

*Primary Examiner* — Alpus H Hsu
(74) *Attorney, Agent, or Firm* — Volpe and Koenig, P.C.

(57) ABSTRACT

A user equipment (UE) may receive a first downlink signal, including a resource assignment having a first indication of a first resource of a plurality of resources and a number of resources of the plurality of resources in a sequence. The downlink signal may include a second indication as to applying the resource assignment to a single time interval or plurality of time intervals, which the UE may determine. The UE may receive a second downlink signal in the first time interval in the first resource and in the number of consecutive resources in the sequence on a condition that the resource assignment is for a single time interval, and a second downlink signal in each of the plurality of time intervals in the first resource and in the number of consecutive resources in the sequence on a condition that the resource assignment is for the plurality of time intervals.

18 Claims, 5 Drawing Sheets

Related U.S. Application Data continuation of application No. 11/975,302, filed on Oct. 18, 2007, now Pat. No. 8,169,979, which is a continuation of application No. 11/270,275, filed on Nov. 9, 2005, now Pat. No. 7,286,509, which is a continuation of application No. 10/145,371, filed on May 14, 2002, now Pat. No. 6,996,082, which is a continuation of application No. 10/029,651, filed on Dec. 21, 2001, now Pat. No. 6,973,064.

(60) Provisional application No. 60/290,717, filed on May 14, 2001.

(51) Int. Cl.
*H04W 72/04* (2009.01)
*H04W 74/02* (2009.01)
*H04W 88/00* (2009.01)
*H04B 7/06* (2006.01)
*H04B 7/26* (2006.01)
*H04J 13/16* (2011.01)

(58) Field of Classification Search
CPC ........ H04B 7/204; H04B 7/212; H04B 7/216; H04B 7/2618; H04B 7/2628; H04B 7/2643; H04B 7/2668; H04B 7/2671; H04W 72/04; H04W 72/042; H04W 72/0446; H04W 72/0466; H04W 72/1289; H04W 74/006; H04W 74/02
See application file for complete search history.

(56) References Cited

U.S. PATENT DOCUMENTS

| | | | |
|---|---|---|---|
| 5,404,376 A * | 4/1995 | Dent | 375/138 |
| 5,481,533 A | 1/1996 | Honig et al. | |
| 5,533,013 A | 7/1996 | Leppanen | |
| 5,539,730 A | 7/1996 | Dent | |
| 5,566,168 A | 10/1996 | Dent | |
| 5,603,081 A | 2/1997 | Raith et al. | |
| 5,612,954 A | 3/1997 | Sandquist | |
| 5,754,536 A | 5/1998 | Schmidt | |
| 5,894,473 A * | 4/1999 | Dent | H04J 13/00 370/320 |
| 5,940,006 A * | 8/1999 | MacLellan et al. | 370/314 |
| 6,078,576 A | 6/2000 | Schilling et al. | |
| 6,088,326 A | 7/2000 | Lysejko et al. | |
| 6,112,080 A * | 8/2000 | Anderson | G10L 19/012 370/335 |
| 6,134,226 A | 10/2000 | Reed et al. | |
| 6,144,650 A | 11/2000 | Watanabe et al. | |
| 6,144,653 A | 11/2000 | Persson et al. | |
| 6,160,802 A | 12/2000 | Barrett | |
| 6,222,819 B1 | 4/2001 | Lysejko et al. | |
| 6,272,166 B1 | 8/2001 | Dabak | |
| 6,339,612 B1 | 1/2002 | Stewart et al. | |
| 6,381,211 B1 | 4/2002 | Lysejko et al. | |
| 6,463,054 B1 | 10/2002 | Mazur et al. | |
| 6,480,504 B1 | 11/2002 | Wang et al. | |
| 6,483,826 B1 * | 11/2002 | Åkerberg | 370/335 |
| 6,522,625 B1 | 2/2003 | Hayashi et al. | |
| 6,590,889 B1 | 7/2003 | Preuss et al. | |
| 6,631,124 B1 | 10/2003 | Koorapaty et al. | |
| 6,714,523 B2 | 3/2004 | Zeira et al. | |
| 6,714,526 B2 | 3/2004 | Wei et al. | |
| 6,721,294 B1 * | 4/2004 | Bahrenburg | H04B 7/26 370/335 |
| 6,760,599 B1 * | 7/2004 | Uhlik | 455/525 |
| 6,781,975 B1 | 8/2004 | Baier et al. | |
| 6,791,961 B2 | 9/2004 | Zeira et al. | |
| 6,810,030 B1 | 10/2004 | Kuo | |
| 6,813,255 B1 * | 11/2004 | Goderis et al. | 370/335 |
| 6,985,457 B2 | 1/2006 | Zeira et al. | |
| 6,990,118 B2 | 1/2006 | Zeira et al. | |
| 7,023,815 B2 | 4/2006 | Zeira et al. | |
| 7,068,618 B2 | 6/2006 | Zeira et al. | |
| 7,072,312 B2 | 7/2006 | Zeira et al. | |
| 7,227,855 B1 * | 6/2007 | Barratt | H04W 72/06 370/343 |
| 7,430,197 B1 * | 9/2008 | Uhlik | 370/347 |
| 7,567,624 B1 * | 7/2009 | Schmidl et al. | 375/299 |
| 2003/0076812 A1 | 4/2003 | De Benedittis | |

FOREIGN PATENT DOCUMENTS

| | | |
|---|---|---|
| EP | 0 876 008 | 11/1998 |
| EP | 0 993 213 | 4/2000 |
| EP | 1 093 315 | 4/2001 |
| GB | 2 350 759 | 12/2000 |
| JP | 07/303090 | 11/1995 |
| JP | 11-041192 | 2/1999 |
| JP | 2000-156651 | 6/2000 |
| JP | 2000-165955 | 6/2000 |
| JP | 2002-319922 | 10/2002 |
| WO | 93/15573 | 8/1993 |
| WO | 01/33742 | 5/2001 |

OTHER PUBLICATIONS

3GPP, "3rd Generation Partnership Project; Technical Specification Group Radio Access Network; Radio Resource Control (RRC); Protocol Specification (Release 1999)," 3GPP TS 25.331 V3.8.0 (Sep. 2001).

3GPP, "3rd Generation Partnership Project; Technical Specification Group Radio Access Network; Radio Resource Control (RRC); Protocol Specification (Release 4)," 3GPP TS 25.331 V4.0.0 (Mar. 2001).

3GPP, "3rd Generation Partnership Project; Technical Specification Group Radio Access Network; Radio Resource Control (RRC); Protocol Specification (Release 4)," 3GPP TS 25.331 V4.2.1 (Sep. 2001).

3GPP, "3rd Generation Partnership Project; Technical Specification Group Radio Access Network; Multiplexing and channel coding (TDD) (Release 1999)," 3GPP TS 25.222 V3.6.0 (Mar. 2001).

3GPP, "3rd Generation Partnership Project; Technical Specification Group Radio Access Network; Multiplexing and channel coding (TDD) (Release 4)," 3GPP TS 25.222 V4.0.0 (Mar. 2001).

3GPP, "3rd Generation Partnership Project; Technical Specification Group Radio Access Network; Multiplexing and channel coding (TDD) (Release 4)," 3GPP TS 25.222 V4.1.0 (Sep. 2001).

3GPP, "3rd Generation Partnership Project; Technical Support Group Radio Access Network; High Speed Downlink Packet Access (HSDPA); Overall Description; Stage 2 (Release 5)," 3GPP TS 25.308 V5.0.0 (Sep. 2001).

Forkel et al., "Dynamic Channel Allocation in UMTS Terrestrial Radio Access TDD System", IEEE VTS 53rd Vehicular Technology Conference, pp. 1032-1036 (2001).

Motorola, "High Speed Downlink Packet Access (HSDPA) Overview," TSG-RAN Working Group 1 and 2 Adhoc, document No. TSGR1/R2-12A010020, XP-002309505 (Apr. 5-6, 2001).

Motorola, "HSDPA Signaling Requirements," TSG-RAN WG2, document No. R2-A010015, XP 002290533 (Jan. 15, 2001).

Nokia, "HSDPA Related Signaling Parameters in Downlink," TSG-RAN WG1/WG2 Adhoc, document No. 12A010005, XP-002290532, (Apr. 5-6, 2001).

Ortigoza-Guerrero et al., "A Dynamic Resource Allocation Strategy for Future UMTS", Universal Personal Communications, IEEE, pp. 377-381 (Oct. 1998).

Park et al., "An Advanced Channel Access Scheme for Integrated Multimedia Services with Various Bit Rates in CDMA Networks", IEEE Communications Letters, vol. 3, No. 4, pp. 91-93 (Apr. 1999).

Prasad et al., Third Generation Mobile Communications Systems, ISBN 1-58053-082-6, Artech House, Boston, MA, 2000.

Siemens, "Techniques to Support HSDPA for TDD Mode," TSG-RAN WG1 Meeting 18, R1-01-0018 (Jan. 2001).

Third Generation Partnership Project, "Technical Specification Group Radio Access Network; Physical layer procedures (TDD) (Release 1999)," 3GPP TS 25.224 V3.6.0 (Mar. 2001).

(56) References Cited

OTHER PUBLICATIONS

Third Generation Partnership Project, "Technical Specification Group Radio Access Network; Physical layer procedures (TDD) (Release 1999)," 3GPP TS 25.224 V3.8.0 (Sep. 2001).
Third Generation Partnership Project, "Technical Specification Group Radio Access Network; Physical layer procedures (TDD) (Release 4)," 3GPP TS 25.224 V4.0.0 (Mar. 2001).
Third Generation Partnership Project, "Technical Specification Group Radio Access Network; Physical layer procedures (TDD) (Release 4)," 3GPP TS 25.224 V4.2.0 (Sep. 2001).
Wiscom Technologies, "Proposal of a HSDPA Frame Structure in TDD Mode," TSG-RAN WG1 Meeting 19, TSGR1#19(01)0250 (Feb. 27-Mar. 2, 2001).
Third Generation Partnership Project, "Technical Specification Group Radio Access Network; Physical channels and mapping of transport channels onto physical channels (TDD) (Release 1999)," 3GPP TS 25221 V3.6.0 (Mar. 2001).
Third Generation Partnership Project, "Technical Specification Group Radio Access Network; Physical channels and mapping of transport channels onto physical channels (TDD) (Release 1999)," 3GPP TS 25221 V3.8.0 (Sep. 2001).
Third Generation Partnership Project, "Technical Specification Group Radio Access Network; Physical channels and mapping of transport channels onto physical channels (TDD) (Release 4)," 3GPP TS 25.221 V4.0.0 (Mar. 2001).
Third Generation Partnership Project, "Technical Specification Group Radio Access Network; Physical channels and mapping of transport channels onto physical channels (TDD) (Release 4)," 3GPP TS 25.221 V4.2.0 (Sep. 2001).
Third Generation Partnership Project, "Technical Specification Group Radio Access Network; Spreading and modulation (TDD) (Release 1999)," 3GPP TS 25223 V3.5.0 (Mar. 2001).
Third Generation Partnership Project, "Technical Specification Group Radio Access Network; Spreading and modulation (TDD) (Release 1999)," 3GPP TS 25223 V3.7.0 (Sep. 2001).
Third Generation Partnership Project, "Technical Specification Group Radio Access Network; Spreading and modulation (TDD) (Release 4)," 3GPP TS 25.223 V4.0.0 (Mar. 2001).
Third Generation Partnership Project, "Technical Specification Group Radio Access Network; Spreading and modulation (TDD) (Release 4)," 3GPP TS 25.223 V4.2.0 (Sep. 2001).
Lucent Technologies, "Variable TTI proposal for HSDPA," TSG-RAN Working Group 1, TSGR1#18(01)0079, Agenda Item: AH24, HSDPA (Jan. 15-19, 2001).

* cited by examiner

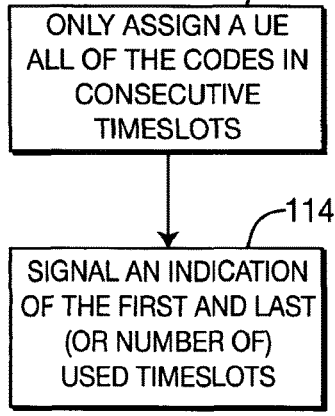
FIG. 11
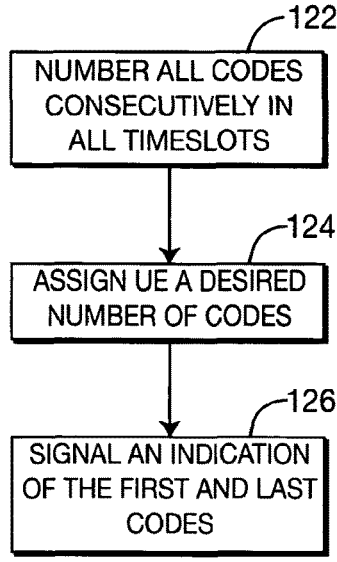
FIG. 14
| CODE | \multicolumn{12}{c}{TIMESLOT} |
|---|---|---|---|---|---|---|---|---|---|---|---|---|
| | S1 | S2 | S3 | S4 | S5 | S6 | S7 | S8 | S9 | S10 | S11 | S12 |
| 0 | | | | | | | | | | | | |
| 1 | | | | | | | | | | | | |
| 2 | | | | | | | | | | | | |
| 3 | | | | | | | | | | | | |
| 4 | | | | | | | | | | | | |
| 5 | | | | | | | | | | | | |
| 6 | | | | | | | | | | | | |
| 7 | | | | | | | | | | | | |
| 8 | | | | | | | | | | | | |
| 9 | | | | | | | | | | | | |
| 10 | | | | | | | | | | | | |
| 11 | | | | | | | | | | | | |
| 12 | | | | | | | | | | | | |
| 13 | | | | | | | | | | | | |
| 14 | | | | | | | | | | | | |
| 15 | | | | | | | | | | | | |
UE A   UE B   UE C
FIG. 12
| CODE | S1 | S2 | S3 | S4 | S5 | S6 | S7 | S8 | S9 | S10 | S11 | S12 |
|---|---|---|---|---|---|---|---|---|---|---|---|---|
| 0 | 1 | 17 | 33 | 49 | 65 | | | 113 | | 145 | 161 | |
| 1 | 2 | 18 | 34 | 50 | 66 | | | 114 | | 146 | | |
| 2 | 3 | 19 | 35 | 51 | 67 | | | 115 | | 147 | | |
| 3 | 4 | 20 | 36 | 52 | 68 | | | 100 | 116 | 148 | | |
| 4 | 5 | 21 | 37 | 53 | | | | 101 | 117 | 149 | | |
| 5 | 6 | 22 | 38 | 54 | | | | 102 | 118 | 150 | | 182 |
| 6 | 7 | 23 | 39 | 55 | | | | 103 | 119 | 151 | | 183 |
| 7 | 8 | 24 | 40 | 56 | | | | 104 | 120 | 152 | | 184 |
| 8 | 9 | 25 | 41 | 57 | | | | 105 | 121 | 153 | | 185 |
| 9 | 10 | 26 | 42 | 58 | | | | 106 | 122 | 154 | | 186 |
| 10 | 11 | 27 | 43 | 59 | | | | 107 | 123 | 155 | | 187 |
| 11 | 12 | 28 | 44 | 60 | | | | 108 | 124 | 156 | | 188 |
| 12 | 13 | 29 | 45 | 61 | | | | 109 | 125 | 157 | | 189 |
| 13 | 14 | 30 | 46 | 62 | | | | 110 | 126 | 158 | | 190 |
| 14 | 15 | 31 | 47 | 63 | | | | 111 | 127 | 143 | 159 | 191 |
| 15 | 16 | 32 | 48 | 64 | | | | 112 | 128 | 144 | 160 | 192 |
UE A   UE B   UE C
FIG. 15

| SCHEME | BITS REQUIRED IF ALL INFORMATION IS SIGNALED PRIOR | PRIOR SIGNALED INFORMATION | POST SIGNALED INFORMATION |
|---|---|---|---|
| SCHEME 1, CONSECUTIVE CODES | 96 | 16 | 80 |
| SCHEME 2, COMMON CONSECUTIVE CODES | 20 | 16 OR 13 | 10 |
| SCHEME 3, COMMON CONSECUTIVE CODES IN CONSECUTIVE TIMESLOTS | 16 | 13 | 4 |
| SCHEME 4, ENTIRE TIMESLOT WITH TIMESLOT FLEXIBILITY | 12 (16 IF FOUR BITS ARE NEEDED TO INDICATE THE MAXIMUM NUMBER OF CODES) | 8 OR 5 | 12 OR 9 |
| SCHEME 5, ENTIRE CONSECUTIVE TIMESLOTS WITH TIMESLOT FLEXIBILITY | 8 (12 IF FOUR BITS ARE NEEDED TO INDICATE THE MAXIMUM NUMBER OF CODES) | 5 OR 9 | 4 |
| SCHEME 6, NUMBER ALL CODES CONSECUTIVELY IN ALL TIMESLOTS | 16 | 13 (OR LESS) | VARIABLE |

*FIG. 13*

HYBRID APPARATUS USING PHYSICAL CHANNELS

CROSS REFERENCE TO RELATED APPLICATIONS

This application is a continuation of U.S. patent application Ser. No. 13/458,377 filed Apr. 27, 2012 which is a continuation of U.S. patent application Ser. No. 11/975,302 filed Oct. 18, 2007, now issued U.S. Pat. No. 8,169,979, which is a continuation of U.S. patent application Ser. No. 11/270,275 filed Nov. 9, 2005, now issued U.S. Pat. No. 7,286,509, which is a continuation of U.S. patent application Ser. No. 10/145,371 filed May 14, 2002, now issued U.S. Pat. No. 6,996,082, which is a continuation of U.S. patent application Ser. No. 10/029,651 filed Dec. 21, 2001, now issued U.S. Pat. No. 6,973,064, which claims the benefit of U.S. Provisional Patent Application No. 60/290,717 filed May 14, 2001, all of which are incorporated herein by reference as if fully set forth.

BACKGROUND

The invention is generally related to wireless hybrid time division multiple access (TDMA)/code division multiple access (CDMA) communication systems. In particular, the invention relates to configuring physical channels in such systems.

Wireless communication systems are evolving from carrying primarily voice and paging information to carrying voice, paging and other data information, such as wireless Internet data. The bandwidth required for all these types of information varies greatly. Some of this data requires far more bandwidth than traditional voice and paging information.

In CDMA communication systems, multiple communications are sent in a shared spectrum. These communications are distinguished by their channelization codes. To more efficiently use the shared spectrum, hybrid TDMA/CDMA communication systems time divide the shared bandwidth into repeating frames having a specified number of timeslots. A communication is sent in such a system using one or multiple timeslots and one or multiple codes. One such system is the universal mobile telecommunication systems (UMTS) time division duplex (TDD) communication system using CDMA, which uses fifteen (15) timeslots. In TDD, a particular cell's timeslot is used only for either uplink or downlink communications.

To deal with the variety of bandwidths required for various communications, adaptive modulation and coding (AM&C) is used. In AM&C, the modulation and coding scheme for transmitting data is varied to more efficiently use the radio resources. To illustrate, the modulation used for data may be varied, such as using binary phase shift keying (BPSK), quadrature phase shift keying (QPSK), or Mary quadrature amplitude modulation. Furthermore, the data may be assigned a single code in a timeslot, multiple codes in a timeslot, a single code in multiple timeslots or multiple codes in multiple timeslots.

Since data transmitted to or from particular user equipment (UE) may be sent with a variety of modulation, timeslot and coding schemes, this modulation/timeslot/coding information must be conveyed to the UE. This type of information is typically signaled or broadcast to a UE and is typically performed using a low speed control channel. Signaling this information uses valuable overhead and air resources. Since AM&C is typically not applied to control channels, any information sent over a control channel uses much more air resources than would be required if the information was sent over a channel to which AM&C is applied. However, reducing signaling overhead is desirable regardless of whether or not AM&C is used.

Accordingly, it is desirable to transmit as much of the modulation/timeslot/coding information as possible over channels to which AM&C is applied. Additionally, it is desirable to reduce timeslot and code assignment signaling.

SUMMARY

A wireless hybrid time division multiple access/code division multiple access (TDMA/CDMA) user equipment (UE) includes a signaling receiver and a data detection device in communication with the signaling receiver. The signaling receiver is configured to receive and recover signaled information of code and timeslot assignments of the UE to support a radio frequency (RF) communication. The data detection device is configured to recover from the signaling information an identifier of a plurality of assigned timeslots and an indication of a first and last code of a set of consecutive codes. The last code is identified by an identifier associated with the last code.

A wireless hybrid user equipment (UE) may include an antenna and a receiver to receive a first downlink signal, which may include a resource assignment having a first indication of a first resource of a plurality of resources a number of resources of the plurality of resources. The plurality of resources may be in a sequence. Further, the downlink signal may include a second indication as to applying the resource assignment to a single time interval or to a plurality of time intervals. Also, each time interval may include at least one time slot. The UE may also include a controller to determine based on the second indication, whether the resource assignment is for a single time interval or for a plurality of time intervals. The receiver, the antenna and the controller may receive a second downlink signal in the first time interval in the first resource and in the number of consecutive resources in the sequence on a condition that the resource assignment is for a single time interval, and a second downlink signal in each of the plurality of time intervals in the first resource and in the number of consecutive resources in the sequence on a condition that the resource assignment is for the plurality of time intervals.

BRIEF DESCRIPTION OF THE DRAWINGS

FIG. 11 is a flow diagram for signaling using consecutive entire timeslots.

FIG. 12 is a table illustrating consecutive entire timeslot assignments.

FIG. 13 is a table summarizing the bits required to signal the code/timeslot assignments for a sixteen code and twelve available timeslot system.

FIG. 14 is a flow diagram for the method of numbering all codes consecutively in all timeslots.

FIG. 15 is a table illustrating consecutive code assignment.

DETAILED DESCRIPTION OF THE PREFERRED EMBODIMENTS

Figure 1:
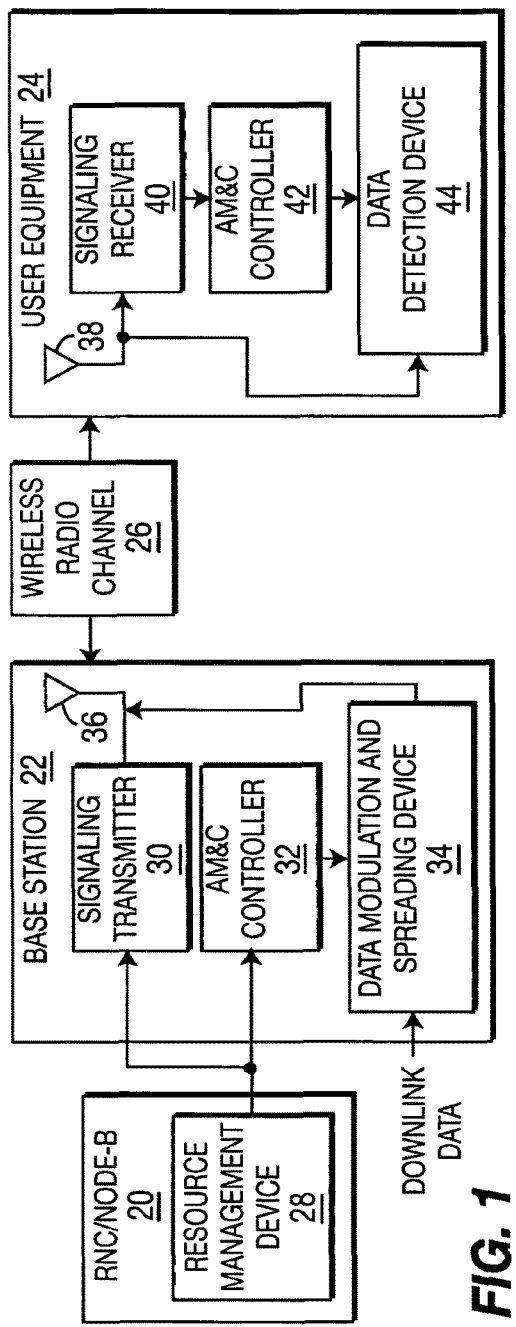
FIG. 1 is a simplified illustration of wireless physical channel configuration signaling system for the downlink.

The present invention will be described with reference to the drawing figures wherein like numerals represent like elements throughout.

Figure 3:
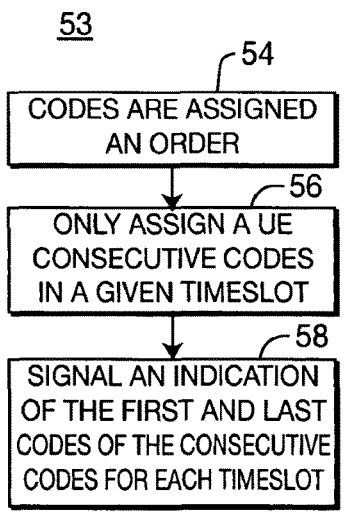
FIG. 3 is a flow diagram for signaling using consecutive codes.
Figure 4:
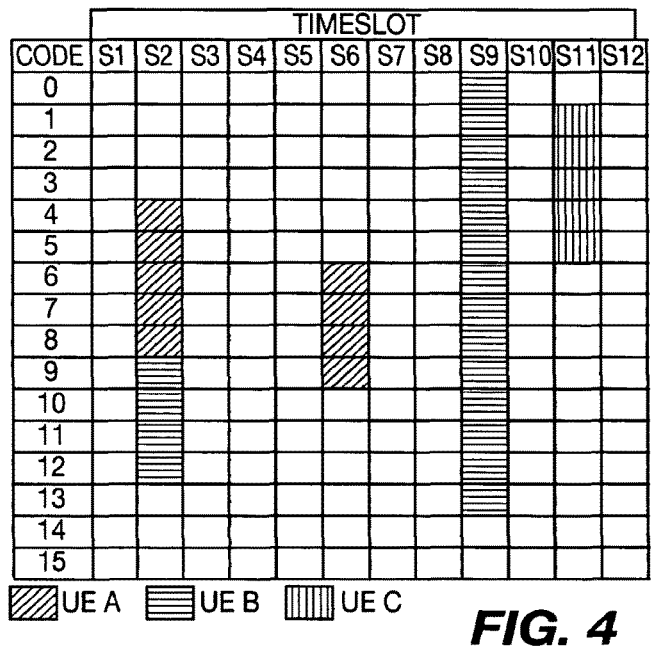
FIG. 4 is a table illustrating assigning using consecutive codes.

One method 53 for assigning codes to timeslots in accordance with the present invention uses consecutive codes and will be described with reference to the flow diagram of FIG. 3, and a simplified illustration of such code assignments for UE A, UE B and UE C is shown in FIG. 4. In FIG. 4, twelve (12) potential timeslots and sixteen (16) potential codes are shown, although the present invention is not limited to a specific number of timeslots and/or codes.

Each timeslot is potentially assigned a predetermined number of codes, such as sixteen codes. The predetermined number of codes are assigned an order or sequence, such as from 0 to 15, (step 54). For a particular UE, only consecutive codes are assigned to that UE in a given timeslot, (step 56). To illustrate, referring to FIG. 4 for UE A in timeslot 2, codes 4-8 are assigned. An assignment of codes 1, 3 and 4 to UE A is not permitted, unless code 2 is also assigned to UE A. Likewise, UE A in timeslot 6 has been assigned codes 6-9; UE B in timeslot 2 has been assigned codes 9-12 and in timeslot 9 has been assigned codes 0-13; and UE C in timeslot 11 has been assigned codes 1-5.

Referring back to FIG. 3, to signal this assignment scheme to a UE, for each assigned timeslot, an indication of the first code and the last code of the consecutive codes is required, (step 58). For a sixteen (16) potential code sequence, eight (8) bits are required. Four (4) bits indicate the start code, (code 0 to 15), and four (4) bits indicate the last code or the number of consecutive codes, (code 0 to 15) or the number (1 to 16) of consecutive codes. For a twelve (12) timeslot system, 96 bits are needed, (eight (8) bits per timeslot by twelve (12) timeslots).

One approach to reduce the number of bits signaled for downlink transmissions in the control channels is to signal only a small portion of the assignment information over a control channel, (hereinafter referred to as "prior signaled information"), and signal the remaining portion of the assignment information with the downlink data, (hereinafter referred to as "post signaled information"). The post signaled information sent with the downlink data will undergo the same AM&C processing as the data, thereby significantly reducing the amount of air resources required to transmit the assignment information over the control channel.

In a typical system, it takes two (2) timeslots to recover the data, since the control information must be received and then processed in order to be ready to receive the actual data. The prior signaled information must therefore only relay the assignment information for the first two (2) timeslots used to transmit downlink data which comprises a four (4) bit indicator for the first used timeslot; a four (4) bit indicator for the next timeslot; and indicators, (two (2) bits each), for the first and last codes for each of the used timeslots. Accordingly, only a maximum of sixteen (16) bits are signaled as prior signaled information. The remaining assignment information is signaled as post signaled information with the downlink data. As a result, for a sixteen (16) code and a twelve (12) timeslot system, only sixteen (16) bits are prior signaled information, with the remaining post signaled information signaled with the downlink data.

One advantage to this approach is that it allows the use of any number of codes in any timeslot. However, this approach requires signaling for typically at least two timeslot assignments, and possibly all timeslot assignments. Although this limits the code choice to consecutive codes, with the use of code reassignment, this restriction is not significant. If an optimal reassignment requires non-consecutive codes, the timeslot UE code usage can be repacked to allow the assignment of only consecutive codes to all UEs.

Figure 5:
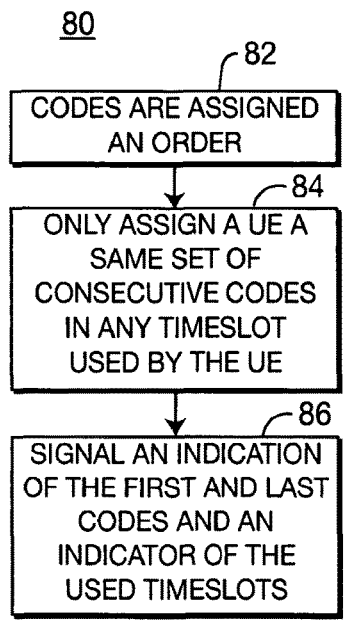
FIG. 5 is a flow diagram for signaling using common consecutive codes.
Figure 6:
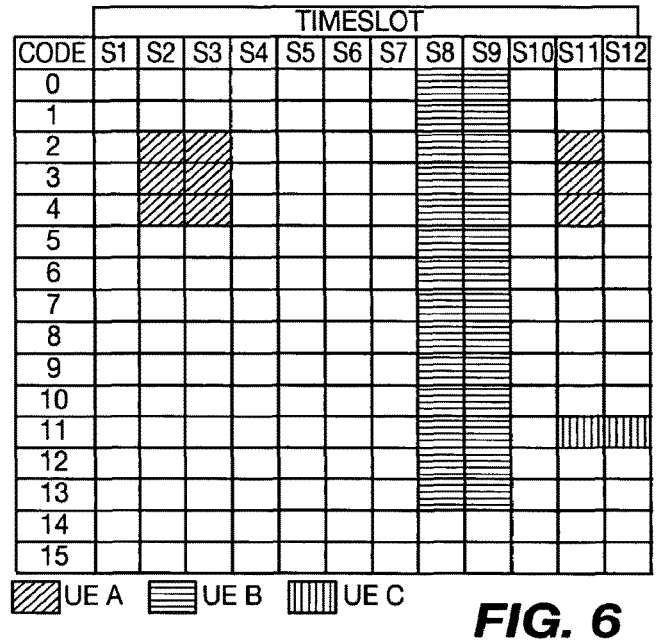
FIG. 6 is a table illustrating assigning using common consecutive codes.

A second method 80 to assign codes and timeslots uses common consecutive codes and is described with reference to the flow diagram of FIG. 5 and the simplified illustration of such code assignments for UE A, UE B and UE C in FIG. 6. Each timeslot is potentially assigned a predetermined number of codes, such as sixteen (16) codes. The predetermined number of codes are assigned an order or sequence, such as from 0 to 15, (step 82). The same set of consecutive codes assigned to one timeslot must be assigned to all timeslots used for a particular UE, (step 84). To illustrate using FIG. 6, UE A is assigned timeslots 2, 3 and 11 and is assigned codes 2-4 in each timeslot. However, since UE A was assigned codes 2-4 in timeslot 2, it could not be assigned only code 2 or codes 2-5 in another timeslot. Likewise, UE B is assigned codes 0-13 in timeslots 8 and 9; and UE C is assigned code 11 in timeslots 11 and 12.

To signal this assignment scheme to a UE, an indication of the first and last codes of the consecutive codes is required as well as an indicator of the used timeslots (step 86). For the system of FIG. 6, eight (8) bits are required for the consecutive codes, (four (4) bits for the first code and four (4) bits for the last code or number of codes), and twelve (12) bits to identify the used timeslot(s). Each bit corresponds to a timeslot. In one (1) implementation, a one (1) bit value indicates that the timeslot is used and a zero (0) bit value indicates that it is not used. Thus, a total of twenty (20) bits are required.

The use of prior signaled information and post signaled information with this method 80 reduces the number of prior signaled bits. The prior signaled information must indicate the first used timeslot and the following timeslot, and the first and last codes of the common sequence. For the system of FIG. 6, eight (8) bits indicating the first two (2) timeslots of the twelve (12) timeslots, (four (4) bits to indicate each timeslot) and eight (8) bits for the start and end codes or number of codes. Thus, a total of sixteen (16) bits of prior signaled information is required.

To further reduce the bits of the prior signaled information, five (5) bits may be used for the first two (2) timeslots. Four (4) bits indicates the first used timeslot and the fifth bit represents whether the following timeslot is used. As a result, either sixteen (16) or thirteen (13) bits are prior signaled information, with at most ten (10) bits of post signaled information.

One advantage to the second method is that it reduces the amount of prior signaled information. One drawback is that it reduces flexibility in code and timeslot assignments, since each timeslot used by a particular UE must be assigned the same codes.

Figure 7:
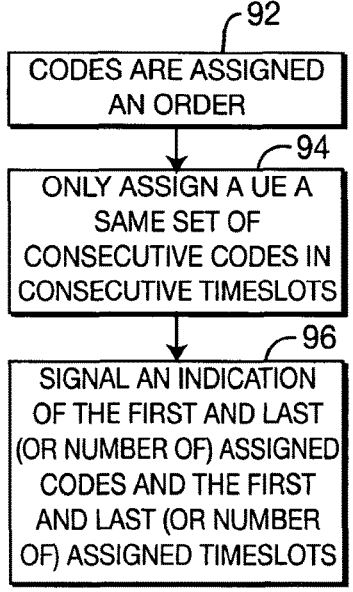
FIG. 7 is a flow diagram for signaling using common consecutive codes in consecutive timeslots.
Figure 8:
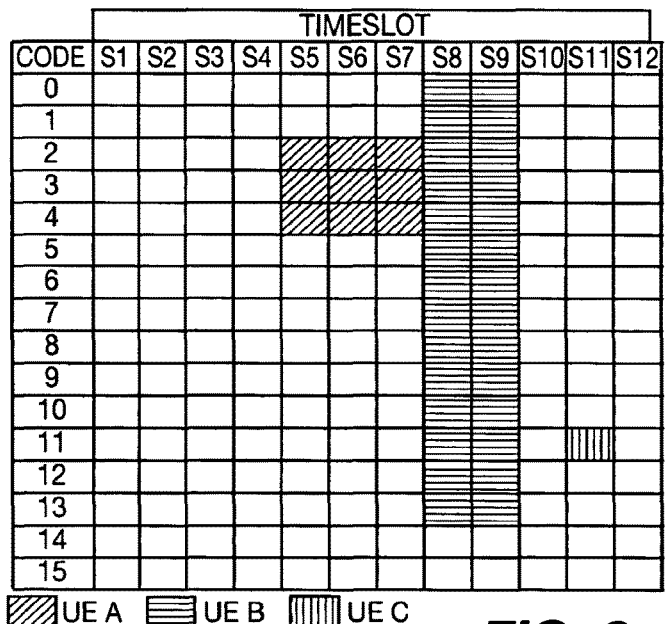
FIG. 8 is a table illustrating assigning using common consecutive codes in consecutive timeslots.

A third method 90 for code and timeslot assignment uses common consecutive codes in consecutive timeslots and is described with reference to the flow diagram of FIG. 7 and the simplified illustration of such code assignments for UE A, UE B and UE C in FIG. 8. Each timeslot is potentially assigned a predetermined number of codes, such as sixteen (16) codes. The predetermined number of codes are assigned an order or sequence, such as from 0 to 15, (step 92). In this approach, not only are the same codes assigned for each used timeslot, but also only consecutive timeslots may be assigned, (step 94). To illustrate using FIG. 8, UE A is assigned codes 2-4 in timeslots 5-7. However, UE A could not be assigned codes 2-4 in timeslots 5, 6 and 8, unless timeslot 7 was also assigned. Likewise, UE B is assigned codes 0-13 in timeslots 8 and 9. UE B could not be assigned a lesser or greater number of codes in any other timeslots, nor could it be assigned codes 0-13 in timeslot 11 or 12, unless timeslot 10 was also assigned. UE C is assigned code 11 in timeslot 11.

To signal this assignment scheme to a UE, an indication of the first and last (or number of) assigned codes in each assigned timeslot and an indication of the first and last (or number of) assigned timeslots, (step 96). For the system of FIG. 8, eight (8) bits are required for the code assignments and eight (8) bits for the timeslot assignments, (four (4) for the first timeslot and four (4) for the last, or number of, timeslots), totaling sixteen (16) bits.

The use of prior signaled information and post signaled information with this method 90 reduces the number of prior signaled bits. In this method 90, thirteen (13) bits must to be signaled prior to the data, (eight (8) for the codes used in the timeslots, four (4) for the first used timeslot and one (1) bit to indicate whether another timeslot is used). If another timeslot is used, four (4) bits indicating the last, or number of, timeslots are signaled as post signaled information with the data.

This third method limits the amount of signaling, but at the expense of code/timeslot assignment flexibility.

Figure 9:
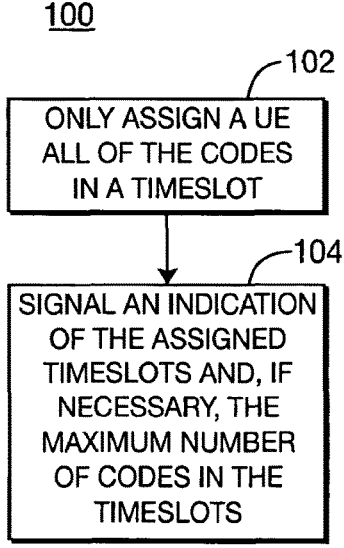
FIG. 9 is a flow diagram for signaling using entire timeslot assignments.
Figure 10:
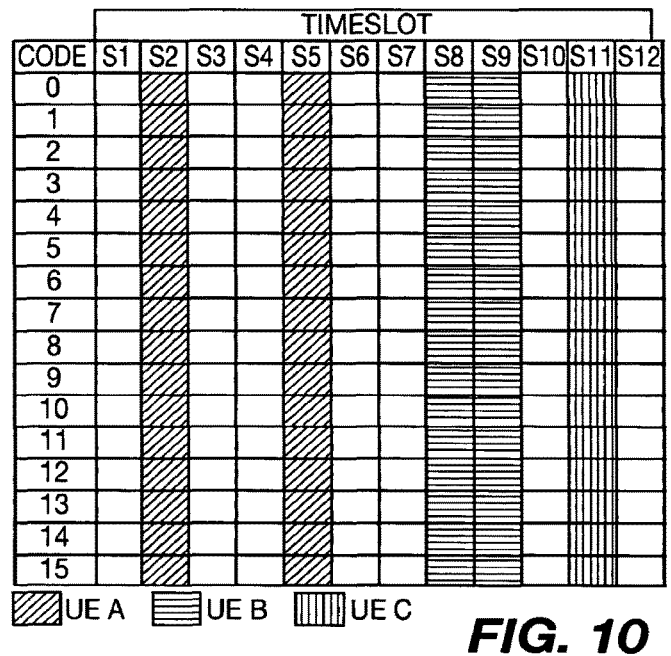
FIG. 10 is a table illustrating entire timeslot assignments.

A fourth method 100 to assign codes and timeslots assigns UEs all the codes in a timeslot and is described with reference to the flow diagram of FIG. 9 and the simplified illustration of such code assignments for UE A, UE B and UE C in FIG. 10. In this approach, the UEs are assigned all of the codes in a timeslot (step 102). To illustrate using FIG. 10, UE A is assigned all the codes of timeslots 2 and 5, UE B is assigned all of the codes of slots 8 and 9, and UE C is assigned all of the codes of timeslot 11.

To signal this assignment scheme to a UE, an indicator of the assigned timeslots is needed, (step 104). For the system of FIG. 10, the indicator is a twelve (12) bit field, with each bit representing whether a particular timeslot is used. Typically, the maximum number of codes in a timeslot is known by the UE. However, if the maximum number of codes is not known, an indicator of the number of codes is sent, (also a part of step 104), such as four (4) bits indicating a maximum number of codes ranging from 0 to 16.

The use of prior signaled information and post signaled information with this method 100 reduces the number of prior signaled bits. In this method 100, an indicator of the first two used timeslots is signaled. For the system of FIG. 10, this two timeslot indicator is eight (8) bits. The indicator of the remaining assigned timeslots is signaled as post signaled information with the data in the first timeslot. Alternately, to further reduce the number of signaled bits, five (5) bits of prior signaled information may be used. Four (4) bits indicate the first timeslot and the fifth bit indicates whether the following timeslot is used.

A fifth method 110 for code and timeslot assignment uses entire consecutive timeslots and is described with reference to the flow chart of FIG. 11 and the simplified illustration of such assignments for UE A, UE B and UE C in FIG. 12. In this approach, a UE is assigned all of the codes in consecutive timeslots (step 112). To illustrate using FIG. 12, UE A is assigned all the codes of timeslots 2-4. UE A could not be assigned all the codes of timeslots 2, 3 and 5 without also assigning UE A timeslot 4. Likewise, UE B is assigned all of the codes of timeslots 8 and 9; and UE C all of the codes of timeslot 11.

To signal this assignment scheme to a UE, an indicator of the first and last timeslots (or number of) used timeslots is signaled, (step 114). For the system of FIG. 11, eight (8) bits are required, (four (4) for the first used timeslot and four (4) for the last or number of timeslots).

The use of prior signaled information and post signaled information with this method 110 reduces the number of prior signaled bits. In this method 110, only five (5) bits are sent as prior signaled information. Four (4) bits indicate the first used code and the fifth bit indicates whether the following timeslot is used. If the following timeslot is used, four (4) bits are signaled as post signaled information with the transmitted downlink data to indicate the last timeslot or number of timeslots.

A sixth method 120 numbers all codes consecutively in all timeslots and is described with reference to the flow diagram of FIG. 14 in the simplified illustration of such codes assignments for UEA, UEB and UEC in FIG. 15. In this method 120, all of the codes are numbered consecutively in all timeslots (step 122). The UE is then assigned a desired number of codes (step 124). To illustrate using FIG. 15, UEA is assigned codes 69-99, UEB is assigned codes 129-142 and UEC is assigned codes 162-181.

To signal this assignment scheme to a UE, an indicator of the first and last codes is needed (step 126). For the system of FIG. 15, the indicator is sixteen (16) bits, (eight (8) bits for the first codes and eight (8) bits for the last code). Alternatively, the indicator of the first code may be signaled along with the number of codes; particularly when the number of codes is small.

The use of prior signaled information and post signaled information with this method 120 reduces the number of prior signaled bits. In this method 120, thirteen (13) bits must be signaled as prior signaled information, (eight (8) for the first code and five (5) bits for the number of codes in the first two (2) timeslots). If more codes are used, the code count can be superceded in the post signaled information.

The table of FIG. 13 summarizes the bits required to signal the code/timeslot assignment for the six (6) schemes for a sixteen (16) code and twelve (12) available timeslot system.

Although the present invention may be implemented by many physical systems, one such system for implementing the invention will be described with reference to FIG. 1. FIG. 1 illustrates a simplified wireless hybrid TDMA/CDMA communication system for use in physical channel configuration signaling. A preferred implementation is for downlink transmitted data, such as for a high speed downlink channel, although physical channel configuration signaling may also be used in other implementations, such as the uplink.

Downlink data to be communicated to a particular UE 24 is assigned at least one code and at least one timeslot by a resource management device 28. The resource management device 28 may be in a radio network controller (RNC) or Node-B 20. The resource management device 28 assigns codes and timeslots as will be described in detail hereinafter. The assigned code and timeslot are sent to a signaling transmitter 30 and an AM&C controller 32 in the base station 22. The signaling transmitter 30 formats for transmission the code and timeslot information as will also be described in detail hereinafter.

A data modulation and spreading device 34 modulates, spreads and time multiplexes the downlink data in the timeslots and with the codes assigned by the resource management device 28. The modulated data and signaled information is radiated by an antenna 36 or antenna array through a wireless radio channel 26.

At the particular UE 24, the transmitted downlink data and signaled information is received by an antenna 38. A signaling receiver 40 recovers the signaled information and relays it to an AM&C controller 42. The AM&C controller 42 determines the modulation to be used and indicates the code and timeslot used for the downlink data to the data detection device 44. One potential data detection device 44 is a joint detection device using a channel estimation device, although other data detection devices may be used. The data detection device 44 recovers the downlink data using the timeslot and code information from the AM&C controller 42.

Figure 2:
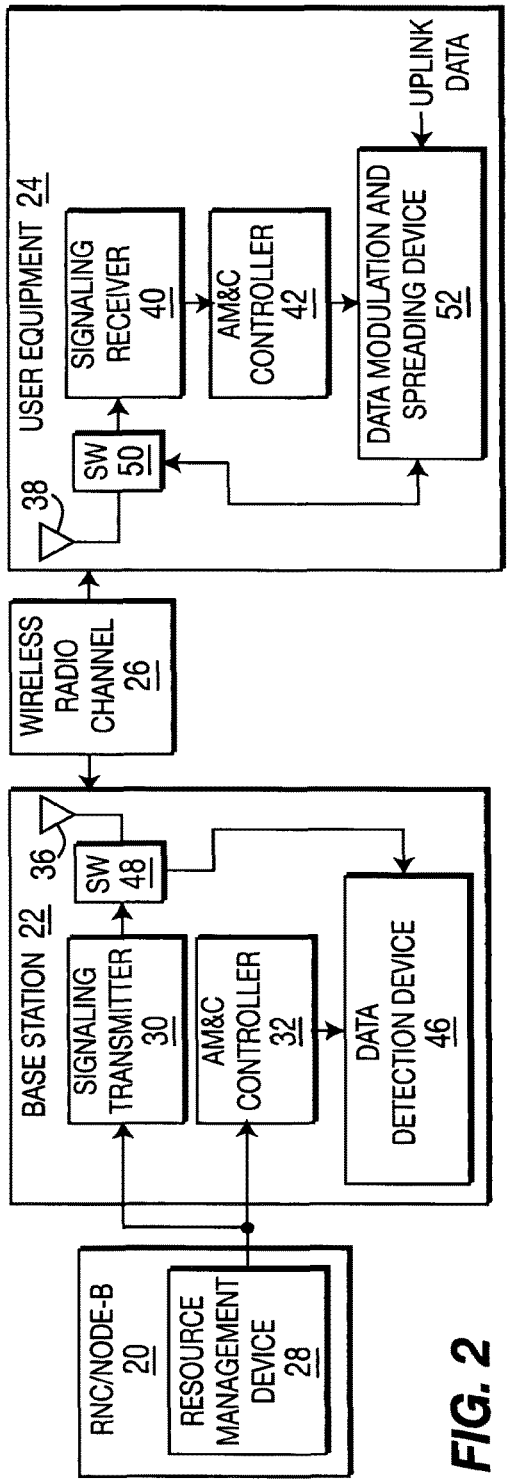
FIG. 2 is a simplified illustration of such a system for the uplink.

FIG. 2 illustrates a simplified system for use in uplink physical channel configuration signaling. The resource management device 28 assigns the code/timeslot to be used for the particular UE's uplink data. The assigned code/timeslot are sent to a signaling transmitter 30 in the base station 22. The signaling transmitter 30 formats for transmission the code and timeslot information as will be described in detail hereinafter. The signaled information is passed through a switch 48 or isolator and radiated by an antenna 36 or antenna array through a wireless radio channel 26.

The particular UE 24 receives the signaled information. The received information is passed thorough a switch 50 or isolator to a signaling receiver 40. The signaled information is recovered by the signaling receiver 40 and relayed to an AM&C controller 42. The AM&C controller 42 relays the uplink code and timeslot assignment to the data modulation and spreading device 52. The data modulation and spreading device 52 modulates, spreads and time multiplexes the uplink data as directed by the AM&C controller 42 in the timeslots and with codes signaled by the base station 22. The modulated data is passed through a switch 50 or isolator and radiated by the UE antenna 38 through the wireless radio channel 26.

The transmitted data is received by the base station antenna 36 or antenna array. The received data is passed through a switch 48 or isolator to a data detection device 46. One possible data detection device 46 is a joint detection device using a channel estimation device, although other data detection devices may be used. A base station AM&C controller 32 receives the code and timeslot assignment from the resource management device 28. The data detection device 46 recovers the uplink data from the received uplink signal using the assigned code and timeslot as directed by the AM&C controller 32.

While the present invention has been described in terms of the preferred embodiment, other variations which are within the scope of the invention as outlined in the claims below will be apparent to those skilled in the art.

What is claimed is:

1. A user equipment comprising:
    an antenna, operatively coupled to a receiver, the antenna and the receiver configured to receive a first downlink signal; wherein the first downlink signal includes a resource assignment having a first indication of a first resource of a plurality of resources and a number of resources of the plurality of resources; wherein the plurality of resources are in a sequence; wherein the downlink signal includes a second indication as to applying the resource assignment to a single time interval or to a plurality of time intervals; wherein each time interval includes at least one time slot;
    a controller, operatively coupled to the receiver, the controller configured to determine, based on the second indication, whether the resource assignment is for a single time interval or for a plurality of time intervals;
    the receiver, the antenna and the controller further configured on a condition that the resource assignment is for a single time interval, to receive a second downlink signal in the first time interval in the first resource and in the number of consecutive resources in the sequence; and
    the receiver, the antenna and the controller further configured on a condition that the resource assignment is for the plurality of time intervals, to receive a second downlink signal in each of the plurality of time intervals in the first resource and in the number of consecutive resources in the sequence.

2. The user equipment of claim 1 wherein the plurality of resources are codes.

3. The user equipment of claim 1 wherein the user equipment is a code division multiple access user equipment.

4. The user equipment of claim 1 wherein the downlink signal is received over a downlink signaling channel.

5. The user equipment of claim 1 wherein the receiver and the antenna are further configured to receive a third downlink signal; wherein the third downlink signal includes assigned time interval information; and
    wherein the receiver, the antenna and the controller, on a condition that the resources assignment is for the plurality of time intervals, are further configured to receive the second downlink signals in response to time intervals derived from the assigned time interval information and the first downlink signal.

6. The user equipment of claim 5 wherein the third downlink signal includes downlink data in addition to the assigned time interval information.

7. A method comprising:
    receiving, by a user equipment, a first downlink signal; wherein the first downlink signal includes a resource assignment having a first indication of a first resource of a plurality of resources and a number of resources of the plurality of resources; wherein the plurality of resources are in a sequence; wherein the downlink signal includes a second indication as to applying the resource assignment to a single time interval or to a plurality of time intervals; wherein each time interval includes at least one time slot;
    determining, based on the second indication, whether the resource assignment is for a single time interval or for a plurality of time intervals;
    on a condition that the resource assignment is for a single time interval, receiving a second downlink signal, by the user equipment, in the single time interval in the first resource and in the number of consecutive resources in the sequence; and on a condition that the resource assignment is for the plurality of time intervals, receive, by the user equipment, a second downlink signal in each of the plurality of time intervals in the first resource and in the number of consecutive resources in the sequence.

8. The method of claim 7 wherein the plurality of resources are codes.

9. The method of claim 7 wherein the user equipment is a code division multiple access user equipment.

10. The method of claim 7 wherein the downlink signal is received over a downlink signaling channel.

11. The method of claim 7 further comprising receiving a third downlink signal; wherein the third downlink signal includes assigned time interval information; and on a condition that the resources assignment is for the plurality of time intervals, receiving the second downlink signals in response to time intervals derived from the assigned time interval information and the first downlink signal.

12. The method of claim 11 wherein the third downlink signal includes downlink data in addition to the assigned time interval information.

13. A network device comprising:

an antenna, operatively coupled to a transmitter;

the transmitter operatively coupled to a controller, the antenna, the transmitter and the controller configured to transmit a first downlink signal; wherein the first downlink signal includes a resource assignment having a first indication of a first resource of a plurality of resources and a number of resources of the plurality of resources; wherein the plurality of resources are in a sequence; wherein the downlink signal includes a second indication as to applying the resource assignment to a single time interval or to a plurality of time intervals; wherein each time interval includes at least one time slot;

the controller configured to determine, based on the second indication, whether the resource assignment is for a single time interval or for a plurality of time intervals;

the transmitter, the antenna and the controller further configured on a condition that the resource assignment is for a single time interval, to transmit a second downlink signal in the first time interval in the first resource and in the number of consecutive resources in the sequence; and the transmitter, the antenna and the controller further configured on a condition that the resource assignment is for the plurality of time intervals, to transmit a second downlink signal in each of the plurality of time intervals in the first resource and in the number of consecutive resources in the sequence.

14. The network device of claim 13 wherein the plurality of resources are codes.

15. The network device of claim 13 wherein the network node is a code division multiple access Node-B.

16. The network device of claim 13 wherein the downlink signal is sent using a downlink signaling channel.

17. The network device of claim 13 wherein the transmitter, the antenna and the controller are further configured to transmit a third downlink signal; wherein the third downlink signal includes assigned time interval information; and wherein the transmitter, the antenna and the controller, on a condition that the resources assignment is for the plurality of time intervals, are further configured to transmit the second downlink signals in response to time intervals derived from the assigned time interval information and the first downlink signal.

18. The network device of claim 17 wherein the third downlink signal includes downlink data in addition to the assigned time interval information.

* * * * *